US007544019B2

(12) United States Patent
Vilkner et al.

(10) Patent No.: US 7,544,019 B2
(45) Date of Patent: Jun. 9, 2009

(54) POWDER INJECTION SYSTEM AND METHOD

(75) Inventors: Torsten Vilkner, Greifswald (DE); Andreas Manz, Surrey (GB)

(73) Assignee: Imperial College Innovations Limited, London (GB)

( * ) Notice: Subject to any disclaimer, the term of this patent is extended or adjusted under 35 U.S.C. 154(b) by 0 days.

(21) Appl. No.: 10/561,573

(22) PCT Filed: Jun. 24, 2004

(86) PCT No.: PCT/GB2004/002718

§ 371 (c)(1), (2), (4) Date: May 15, 2006

(87) PCT Pub. No.: WO2005/001396

PCT Pub. Date: Jan. 6, 2005

(65) Prior Publication Data

US 2006/0245833 A1 Nov. 2, 2006

(30) Foreign Application Priority Data

Jun. 27, 2003 (GB) ................................ 0315094.3

(51) Int. Cl.
*B65G 53/52* (2006.01)
*G01F 11/00* (2006.01)

(52) U.S. Cl. ........................... 406/197; 406/11; 406/50; 406/144

(58) Field of Classification Search ................... 406/50, 406/85, 144, 11, 32, 197
See application file for complete search history.

(56) References Cited

U.S. PATENT DOCUMENTS 1,598,558 A * 8/1926 Cohen ........................ 406/48
3,174,805 A * 3/1965 Mortimer ...................... 406/3

(Continued)

OTHER PUBLICATIONS

F.J.Muzzio, T.Shinbrot, B.J.Glasser, *Powder Technology in the Pharmaceutical Industry: The Need to Catch Up Fast, Pharmaceutical Engineering Program*, Rutgers University, 2002.

(Continued)

*Primary Examiner*—Douglas A Hess
(74) *Attorney, Agent, or Firm*—Fay Sharpe LLP

(57) ABSTRACT

A powder injection method and a powder injection microchip, the powder injection microchip comprising: a gas supply inlet (6) for supplying gas; an outlet (8); a channel (4) in fluid connection with the gas supply inlet and the outlet; a powder inlet (12) in fluid connection with the channel, for receiving a first, open end of a powder reservoir (14), the powder reservoir having an opening (22) at or near to a second end of the powder reservoir to allow egress of gas from the powder reservoir at a point distal to the first end of the powder reservoir. The method comprises the steps of: i) supplying gas via the gas supply inlet (6) to the channel (4) and the powder inlet (12) at a velocity sufficient to cause fluidisation of powder at the powder inlet (12); (ii) reducing the supply of gas to cause powder to pass from the powder inlet and to collect in a region of the channel adjacent a point where the powder inlet connects with the channel; and (iii) repeating steps (i) and (ii) as many times as required, subsequent initialisation of step (i) causing the powder collected in the channel to be moved by the gas towards the outlet.

3 Claims, 6 Drawing Sheets

U.S. PATENT DOCUMENTS

| | | | | | |
|---|---|---|---|---|---|
| 3,206,255 | A * | 9/1965 | Gray | 406/93 |
| 3,380,780 | A * | 4/1968 | Allen | 406/50 |
| 4,420,279 | A * | 12/1983 | Easley, Jr. | 406/14 |
| 4,775,267 | A * | 10/1988 | Yamamoto | 406/50 |
| 5,032,256 | A * | 7/1991 | Vickery | 209/135 |
| 5,098,229 | A | 3/1992 | Meier et al. | |
| 5,985,119 | A * | 11/1999 | Zanzucchi et al. | 204/450 |
| 5,993,750 | A * | 11/1999 | Ghosh et al. | 422/191 |
| 6,238,538 | B1 * | 5/2001 | Parce et al. | 204/600 |
| 6,244,788 | B1 * | 6/2001 | Hernandez | 406/144 |
| 6,514,399 | B1 * | 2/2003 | Parce et al. | 204/600 |
| 6,623,860 | B2 * | 9/2003 | Hu et al. | 428/411.1 |
| 6,710,874 | B2 * | 3/2004 | Mavliev | 356/336 |
| 6,729,352 | B2 | 5/2004 | O'Connor et al. | |
| 6,770,182 | B1 * | 8/2004 | Griffiths et al. | 204/453 |
| 6,787,088 | B2 * | 9/2004 | Parce et al. | 264/241 |
| 6,880,576 | B2 * | 4/2005 | Karp et al. | 137/806 |
| 6,915,679 | B2 * | 7/2005 | Chien et al. | 73/54.01 |
| 6,923,907 | B2 * | 8/2005 | Hobbs et al. | 210/198.2 |
| 6,939,451 | B2 * | 9/2005 | Zhao et al. | 204/451 |
| 6,994,497 | B1 * | 2/2006 | Eriksson et al. | 406/124 |
| 7,040,144 | B2 * | 5/2006 | Spaid et al. | 73/54.05 |
| 7,077,175 | B2 * | 7/2006 | Yin et al. | 141/67 |
| 2002/0074271 | A1 | 6/2002 | Hu et al. | |
| 2006/0245833 | A1 | 11/2006 | Vilkner et al. | |

OTHER PUBLICATIONS

T.Vilkner, A.Manz, *Powder Handling Device for Drug Formulation, Department of Chemistry, Imperial College of Science, Technology, and Medicine*Micro Total Analysis Systems, vol. 1, pp. 1-7, 1-9, Nara, 2002.

* cited by examiner

POWDER INJECTION SYSTEM AND METHOD

The present invention relates to a powder injection microchip for injecting powder components, a powder injection system incorporating the same and a method of injecting powder components.

The injection and/or mixing of powders is employed in many industries for example in the pharmaceutical industry in the blending of dry granular powder compositions such as for use as a powder or in the manufacturer of tablets. Such processes may require the supply of small amounts of each powder composition for each tablet.

Particle handling is a fundamental issue in the pharmaceutical drug development process. The aim of a mixing process is to give the best homogenisation of the actual drug with one or more additional compounds, called excipients. While advances in pharmaceutical and biotechnology research lead to more potent active ingredients in products like tablets, the understanding of processes involved in formulating these products has not been improved at the same rate over the last years. "Powder technology in the pharmaceutical industry: the need to catch up fast", an article by F. J. Muzzio et al, Powder Technology, 124 (1-2): 1-7, 2002 discussed the issue of mixing and dispersing tiny proportions of predominately minute particles with a matrix of much larger particles.

In addition marketplace realities have resulted in less time to optimise formulations or processes for the pharmaceutical companies. Micro-mixers for dry powders could accelerate the preparation time for a specific new composition of drug and excipients compared with currently used devices. This would decrease the time to determine the optimal ratio of ingredients for a new tablet significantly and therefore allow more time to be spent optimising the batch process or the whole process to be shortened.

Useful mixing devices depend on reliable and easily adjustable feeding systems of the different compounds. The aim of an injection process is to supply small amounts of a powder composition when needed and the aim of a mixing process is to give the best homogenisation of the actual drug with one or more additional compounds.

The article "Powder Handling Device for Drug Formulation" by T. Vilkner and A. Manz, Micro Total Analysis Systems 2002, volume 1, pages 1 to 7, 1 to 9, NARA, Japan discusses particle handling on a chip. Micro injections were used to add the particulate materials to the process.

A reproducible injection of very small amounts of powder has even more potential applications than just the feeding of a mixing device in the pharmaceutical industry. Any analytical operation that deals with particles depends on weighing small amounts of powders very precisely. If this has to be done repeatedly it can become very time consuming. A reliable injection system for tiny amounts of dry powder could possibly be employed in many of such applications.

The invention will now be described further, by way of example only, with reference to the accompanying drawings, in which:

FIG. 1*a* shows a three-dimensional view of a micro fabricated powder injection device;

FIG. 1*b* shows a schematic plan view of the micro fabricated powder injection device of FIG. 1*a* (with side A at the bottom of the Figure);

A method and apparatus for injecting and/or mixing powder in a microchip are described. In the following description, for the purposes of explanation, numerous specific details are set fourth to provide a thorough understanding of the present invention. It will be apparent however to one skilled in the art that the present invention may be practised without these specific details. In other instances, well known structures and devices are shown in block diagram form in order to avoid unnecessarily obscuring the present invention.

The needs identified above, and other needs and objects that will become apparent from the following description, are achieved via the microchip powder injection system and method, which comprise in one aspect, a powder injection microchip comprising a gas supply inlet for supplying gas; an outlet; a channel in fluid connection with the gas supply inlet and the outlet; and a powder inlet in fluid connection with the channel. The powder inlet is for receiving a first, open end of a powder reservoir, the powder reservoir having an opening at or near to a second end of the powder reservoir to allow egress of gas from the powder reservoir at a point distal to the first end of the powder reservoir. In use, gas is supplied via the gas supply inlet to the channel and the powder inlet at a velocity sufficient to cause fluidisation of powder at the powder inlet. The velocity of the supplied gas is then reduced to stop fluidisation. This causes powder to pass from the powder inlet and to collect in a region of the channel adjacent a point where the powder inlet connects with the channel. The supply of gas is then restarted. This subsequent initialisation of the gas supply causes the powder collected in the channel to be moved by the gas towards the outlet. The steps of supplying of the gas to cause fluidisation, reducing the gas supply to stop fluidisation and the collection of powder in the channel and the re-starting of the gas may be repeated as many times as required. Each time the powder collected in the channel is moved to the outlet, an injection of powder is provided at the outlet.

Figure 1A:
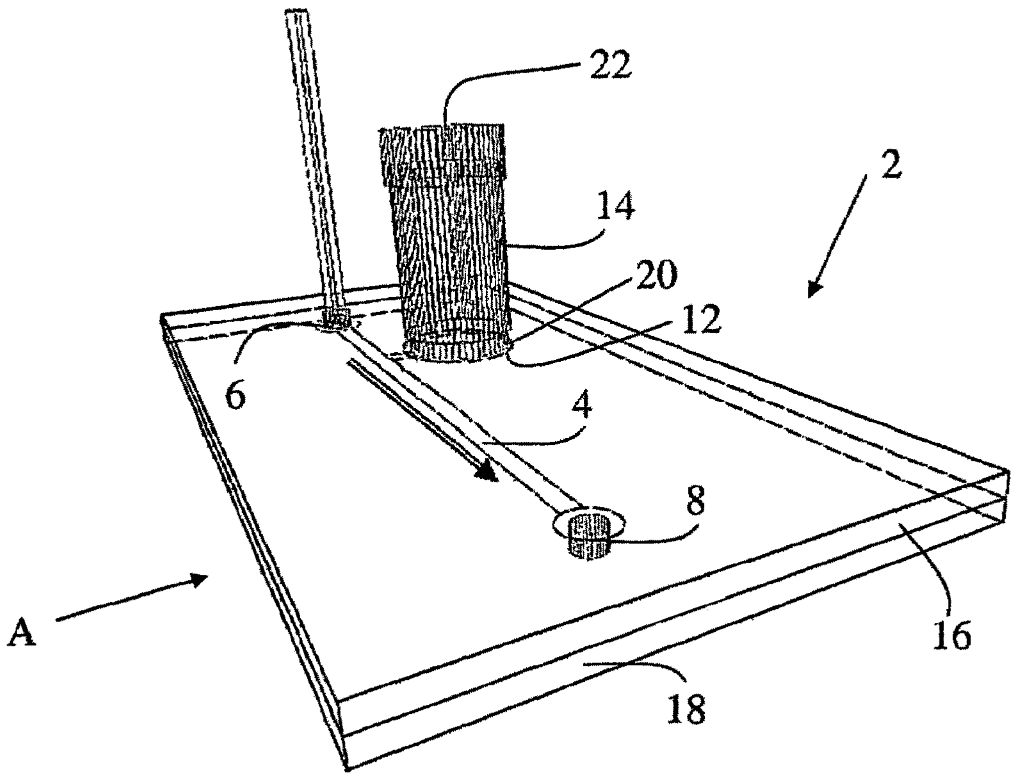
Figure 1B:
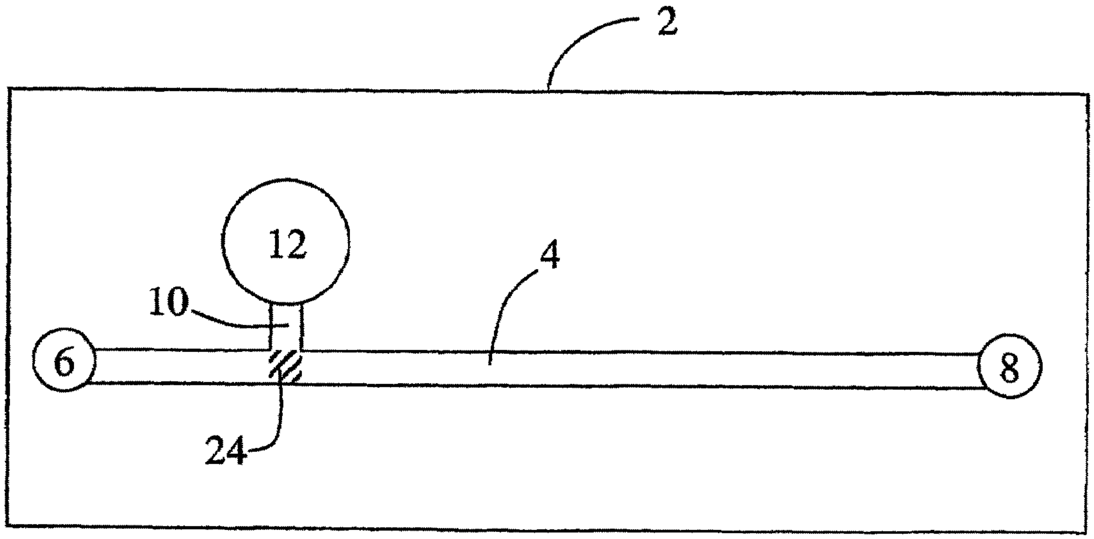

FIGS. 1*a* and 1*b* show a powder injection system comprising a micro fabricated powder injection device. In this embodiment, the device is fabricated as a substrate chip, into which powder components are introduced. The micro fabricated powder injection device 2 as shown in FIG. 1 is T-shaped having a channel 4, a gas inlet 6, an outlet 8 and a powder inlet 12. Powder components are introduced into the channel 4 and passed therethrough. The channel 4 in this embodiment is an elongated linear conduit although other forms of channel are envisaged, for instance (and without limitation) a tapering channel, a winding channel etc.

At least one gas supply inlet 6 is provided at one end of the channel 4 and at least one outlet port 8 at a downstream end of the channel. The powder injection is delivered from the outlet port 8. The gas supply inlet 6 is fluidly connected to the channel 4. The conveying gas may be introduced via a tube inserted into the gas supply inlet. The gas pressure is regulated by a MicroPR® pressure regulator (Redwood Microsystems inc., California, USA). The pressure regulator was controlled by a custom made device allowing the step-free adjustment of the flow rate through the regulator and returning the values for the actual gauge pressure in PSI. The connection to the chip was a 1 cm piece of teflon tubing that was glued onto the chip. At the other end of this tube a piece of PDMS, that had a small hole punched through, was attached. By connecting the teflon tubing coming from the pressure regulator via this piece of PDMS, it was possible to have an airtight sealing and to dismount and reattach the system quickly with no need to glue again.

A powder supply channel 10 is provided with one end being in fluid connection with the channel 4 and with the other end providing a powder inlet 12 for insertion of a reservoir 14 containing powder. The chip comprises two planar layers 16, 18 (e.g. of glass) with wet-etched channels. The arrow indicates the direction of movement of gas introduced via gas inlet 6.

The powder injection microchip may include a controller 11 for controlling the supply of gas via the gas supply inlet 6. The controller 11 may be arranged, in use: (i) to supply gas via the gas supply inlet 6 to the channel 4 and the powder inlet 12 at a velocity sufficient to cause fluidization of powder at the powder inlet, (ii) to reduce the supply of gas to cause powder to pass from the powder inlet 12 and to collect in a region of the channel 4 adjacent a point where the powder inlet connects with the channel, and (iii) to repeat steps (i) and (ii) as many times as required, subsequent initialization of step (i) causing the powder collected in the channel to be moved by the gas towards the outlet 8.

Figure 2:
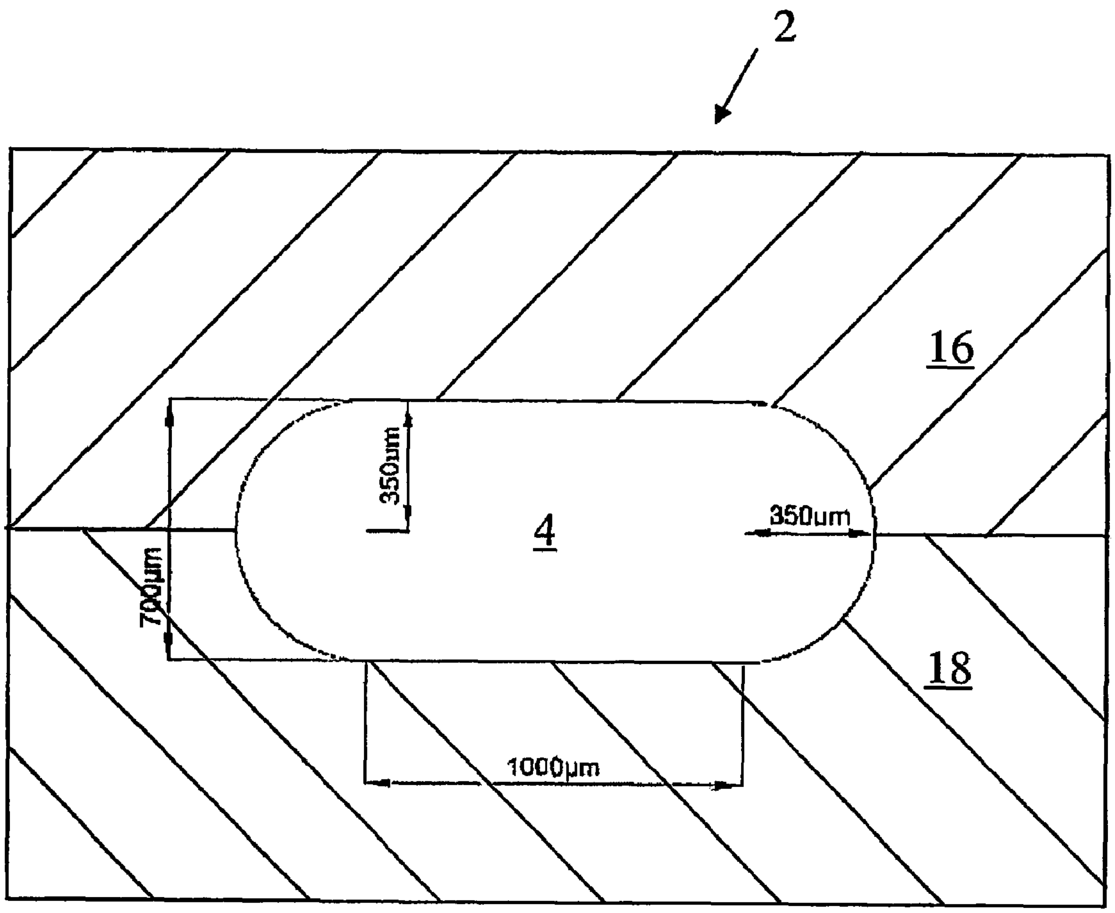
FIG. 2 shows a cross-sectional view of an embodiment of a channel of a micro fabricated powder injection device.

The chip is typically around 7 cm square. The distance between the gas inlet 6 and the outlet 8 is typically around 6 cm and the distance between the powder inlet 12 and the channel 4 is typically 5 mm. Typical dimensions for the channel 4 is a width of 1 mm etched to a depth of 350 μm. To prevent channel blockage, the minimum width of the channel 4 is preferably in excess of twenty times the average particle diameter. To allow for a maximum depth of the channel, each layer of glass includes a channel as shown in FIG. 2, which together form an ellipsoidal channel. Powder is introduced from the reservoir 14, such as a pipette, via an opening 20 in the reservoir 14, e.g. the pipette tip, inserted into the powder inlet 12. A typical diameter for the opening 20 of the pipette tip is around 6 mm. A typical diameter for the outlet 8, which comprises a hole in the bottom plate 18 of the chip, is a diameter of 1 mm.

The end of the powder reservoir 14 that is distal to the powder inlet 12 has an opening 22 to the ambient atmosphere to allow egress of gas (e.g. air) from the reservoir 14. Thus the pressure exerted on the powder near the distal end of the reservoir will be around ambient pressure whereas the pressure at the proximal end of the powder reservoir 14 will be determined by the gas supplied via gas supply inlet 6.

This opening 22 distal to the powder inlet 12 allows the particles in the reservoir 14 to become fluidised. When being streamed through from underneath by the gas, the gravity of the powder particles and their upwards drag force become equivalent at a certain gas velocity and the powder is fluidised. This generally follows a bed expansion, where the packed density is decreased or the formation of bubbles moving towards the top of the powder bed starts. At the minimum fluidisation velocity the powder bed starts showing properties of a fluid.

When a gas pressure is applied at inlet 6, the gas moves out towards both the outlet 8 and the powder inlet 12. At lower gas velocities, the powder bed at the base of the reservoir 14 withstands the pressure from the gas flow and most of the gas escapes via the outlet 8. At a velocity equal to the minimum fluidisation velocity of the powder bed, the powder bed starts fluidising and allows the gas to flow through the powder inlet 12 as well as to the outlet 8. This fluidisation occurs in the pipette tip. Increasing pressure supplied at inlet 6 will increase the amount of fluidisation within the powder bed and the powder reservoir 14 generally. When the gas pressure is turned off, in a rapid manner, the powder bed within the reservoir 14 collapses and forms a packed bed again. When the gas supply is reduced to a velocity below the minimum fluidisation velocity, powder form the powder inlet 12 is drawn by negative pressure into the channel 4. Thus powder from the powder inlet 12 passes from the powder inlet and collects in a region 24 of the channel 4 adjacent the point where the powder inlet 12 is in fluid connection with the channel 4.

Figure 3:
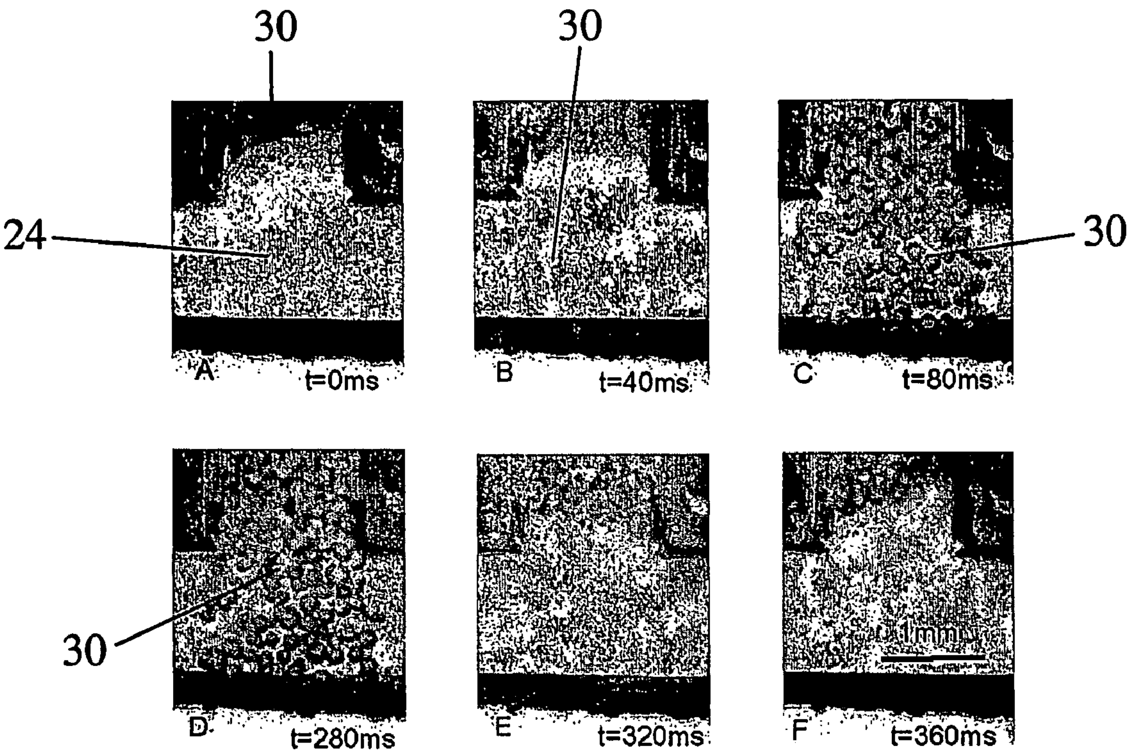
FIG. 3 is a sequence of views of the junction between the channel and the powder inlet in one experimental use of a micro fabricated powder injection device.

Movement of particles from the powder inlet 12 can be seen in FIGS. 3A to 3F which are snapshots of time, as shown by t=x. In these figures, the intersection 24 is shown, with the gas streaming from left to right from the inlet 6 (not shown) to the outlet 8 (not shown) and the powder inlet 12 being shown at the top of each figure. FIG. 3A shows the particles 30 when gas pressure is applied and the particles 30 are fluidised in the powder inlet.

The gas flow is then stopped (t=0) and subsequently some particles 30 from the powder bed are sucked into the channel 4, as shown in FIG. 3B (40 ms after the gas is turned off). When the gas supply is turned off and the gas velocity becomes smaller than the minimum fluidisation velocity, particles in the state of fluidisation have more freedom of movement than in the packed bed. As the bed collapses, individual particles 30 are still relatively free-moving and some particles will still tend to be moving downwards towards the channel 4. Gas in the channel will now escape from the outlet 8 and not from the powder inlet 12 owing to the resistance of the formed powder bed within the reservoir 14.

In FIG. 3C, 80 ms after the gas pressure has been removed, the particles 30 have collected in the region 24 of the channel 4 at the point at which powder supply channel 10 intersects channel 4 to form a powder plug of the particles 30 in the channel 4 as shown in FIG. 3C and 3D. Thus free flowing particles at the powder inlet 12 are dragged by a negative pressure into the main channel 4 between the inlet 6 and the outlet 8 to form a powder plug. The term powder plug does not mean that the powder particles necessarily completely fill and plug the cross-section. A quantity of the particles collects in the cross-section. The powder plug may extend within the channel 4 towards the outlet 8. The higher the fill height of the reservoir 14, the more the powder plug extends towards the outlet 8.

The short distance between the powder inlet 12 and the channel 4 and the rectangular design of the channel 10 are chosen to introduce equal amounts of powder every time the gas is switched off. Preferably the powder plug is stopped by the wall of the channel 4 and only fills the volume 24 of the channel 4 at its intersection with the channel 10.

The gas flow is turned off for a period of time (e.g., 280 milliseconds, as shown in FIG. 3D). When the gas pressure is switched on again, the particles within the cross-section 24 of the channel 4 are blown away towards the outlet 8. Only the particles that fill this volume are moved. Thus a powder plug of a specific volume is formed as shown in FIG. 3D and transported, as shown in FIG. 3E. In addition, when the gas pressure is re-applied, the powder bed in the powder inlet 12 becomes fluidised again when the pressure of the gas supply reaches the minimum fluidisation velocity, as shown in FIG. 3F.

Subsequent rapid reduction of the pressure of the gas supply to zero will allow the formation of another powder plug. This process may be repeated as many times as required with each re-application of the gas supply causing the powder plug to be blown away and fluidisation beginning again once the velocity of the gas reaches the minimum fluidisation velocity.

The gas supplied to the micro fabricated powder injection device 2 is pressurized above ambient pressure. Any suitable gas may be used for instance nitrogen or compressed air. The gas pressure may be controlled by the controller 11 such that the powder bed in powder inlet 12 is fluidized without extensive elutriation, the process in which finer particles are carried out of a fluidized bed owing to the fluid flow rate passing through the bed. A Y-valve (not shown) may be provided to switch the gas stream to the chip 2 on and off and may be mounted between a pressure regulating valve and the chip. The injection time and number of injections may be digitally regulated (for instance using a Microrobotics® Relay Card 5620 controlled by Microrobotics® K4 Application Board III 5525).

EXAMPLE

Figure 4A:
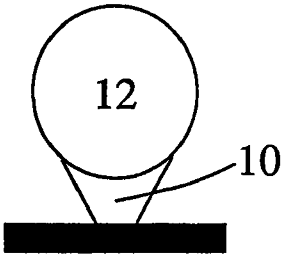
FIG. 4 shows two exemplary embodiments of the arrangement of the powder inlet and the channel of the device of FIG. 1.

The following experiments were carried out to investigate the reproducibility of the negative pressure injection over a broad mass range of a powder. The tests were conducted with a chip having a channel layout as shown in FIG. 1 but with a powder supply channel 10 as shown in FIG. 4*a*. The powder hopper 14 was filled up with Dibasic Calcium Phosphate (Fujicalin®) to a height that was marked on the hopper. The gas pressure was manually adjusted until fluidisation occurred and was then kept constant at 11.6 PSI over the whole series of experiments. An Eppendorf tube was employed as the collection vessel for the separated powder. The chip was placed on a plastic holder so that the collection vessel could be attached directly under the outlet 8. The mass of the collection vessel was weighed before and after each series of injections. Series of 1, 2, 5, 7, 10, 20, 35 and 50 injections were performed to demonstrate deviations over a large range of injections and the small injection volumes. After each series the collection vessel was carefully removed from the chip and weighed. The particles were returned into the powder hopper to ensure similar conditions with respect to the fill height for the next injection series. Before being reattached to the chip, adhering particles were cleaned from the surface of the collection vessel using pressurised air. The mass of the empty collection vessel was subtracted from the weighed mass to obtain the actual mass of powder injected. With the intention of showing a dependency on the fill height, the powder level in the hopper 14 was changed by filling with more powder and the new level was marked again. The series of injections was repeated for 5 different fill heights (14, 24, 26, 34 and 39 mm).

The results of the reproducibility tests indicated that the volume of the channel 10 connecting the powder inlet 12 and the main flow channel 4 is a dead volume which is filled each time with particles that are not further transported towards the outlet 8. To prove this hypothesis, a similar set of experiments as described above was conducted in a channel with another design (see FIG. 4*b*). Series of 1, 2, 5, 7, 10, 20, 35 and 50 injections of Dibasic Calcium Phosphate (Fujicalin®) were performed on fill heights of 15, 22 and 28 mm. The fluidising pressure was kept constant at 11.6 PSI.

Figure 5:
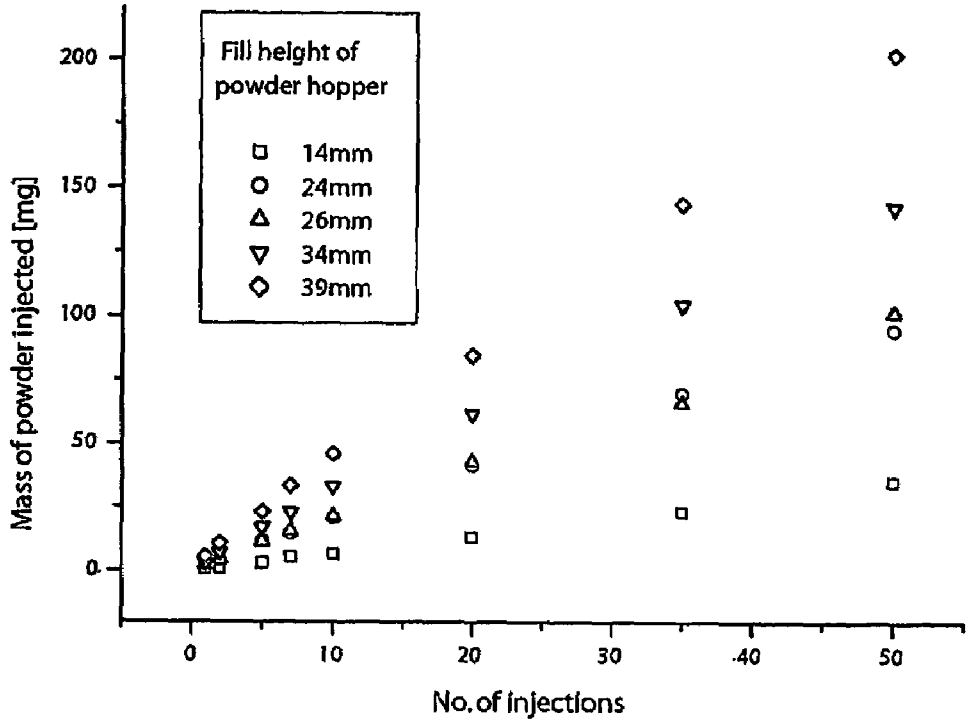
FIG. 5 is a graph showing the masses of particles collected that were injected in each series with a different fill height using the channel arrangement shown in FIG. 4*a;*

The weighed masses showed reproducible linearity within the range from 1 to 50 injections as illustrated in FIG. 5. It can also be seen that the gradient of each series, which actually represents the average mass of one injection, increased with the fill height of the powder hopper. The corresponding value for the mass (B) of a single injection as well as the correlation coefficients (R), which are appreciably high, are given in Table 1.

TABLE 1

| Full Height [mm] | B [mg] | Error [mg] | R | N |
|---|---|---|---|---|
| 14 | 0.69 | 0.01 | 0.9989 | 8 |
| 24 | 1.94 | 0.03 | 0.9992 | 8 |
| 26 | 2.00 | 0.03 | 0.9984 | 8 |
| 34 | 2.93 | 0.04 | 0.9993 | 8 |
| 39 | 4.10 | 0.05 | 0.9997 | 8 |

Linear regression for each series: Y=B×X. The gradient B is the average mass of one single injection.

Figure 6:
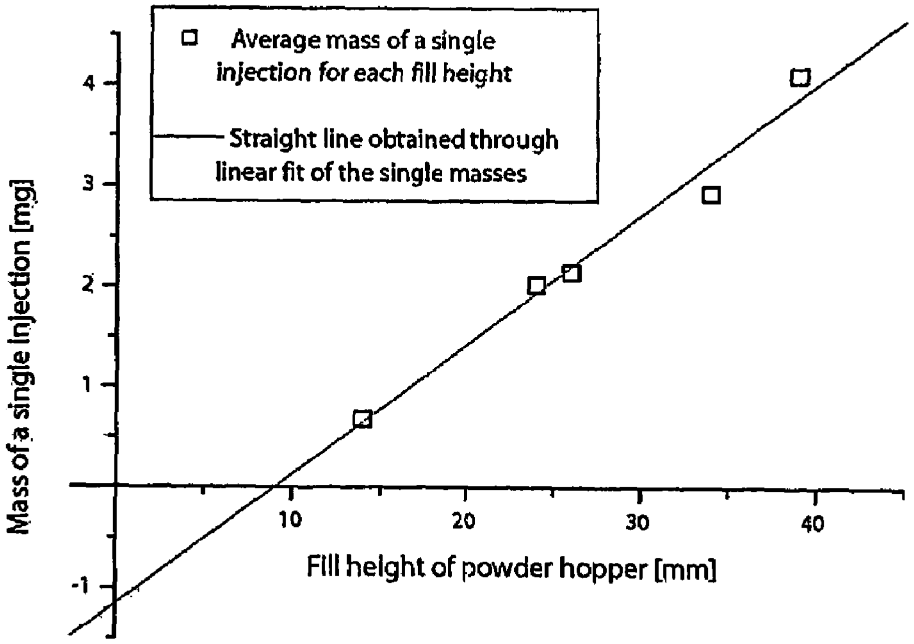
FIG. 6 is a graph showing the average mass of a single injection versus fill height obtained using the channel arrangement shown in FIG. 4*a;*

The dependency of the injection mass may be determined from the bed height in the powder hopper. To do that the calculated values for the average masses of a single injection were plotted against the fill height of the powder hopper 14. From FIG. 6 it can be seen that the average mass of a single injection for each series correlated linearly to the height of the powder bed in the hopper. The equation of the linear regression is given in Table 2.

TABLE 2

| Parameter | Value | Error |
|---|---|---|
| A | −1.16 | 0.33 |
| B | 1.29 | 0.12 |

Linear Regression of average masses: Y=A+B×X.

Interestingly the straight line of the linear fitting intersects the Y-axis at a value of about −1.2 mg instead of 0 mg at the origin of the graph. It is likely that a certain amount of powder is retained during every injection and that the channel 10 that connects the powder inlet 12 with the main channel 4 may act as a dead volume in the system. FIGS. 3E-F support this idea as only the particles located directly in the intersection 24 were transported towards the outlet.

Figure 7:
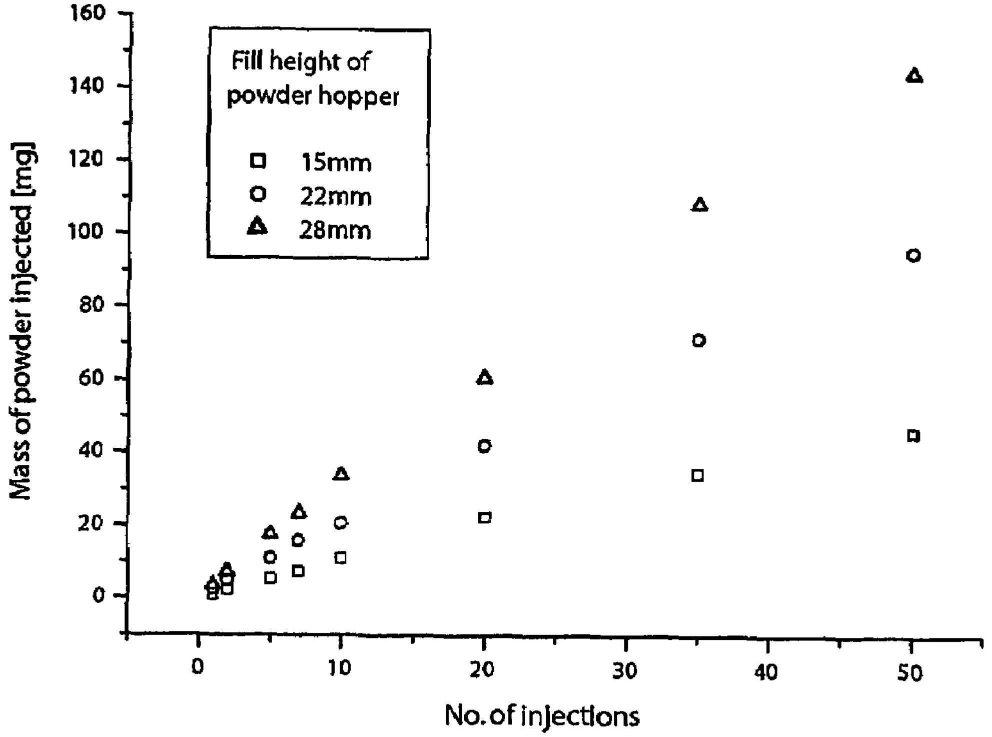
FIG. 7 is a graph showing the masses of particles collected that were injected in each series with a different fill height using the channel arrangement shown in FIG. 4*b;*

The intention of the second series of experiments was to confirm the hypothesis that the small connecting channel 10 between powder inlet 12 and the main channel 4 acted as a dead volume. FIG. 7 is a graph showing the masses of particles collected that were injected in each series with a different fill height using the channel arrangement shown in FIG. 4*b*. The results given in FIG. 7 compare well with the data of the first experiments in terms of linearity. The values of the average masses of a single injection in the series are listed in Table 3.

TABLE 3

| Fill height [mm] | B [mg] | Error [mg] | R | N |
|---|---|---|---|---|
| 15 | 1.11 | 0.01 | 0.9996 | 6 |
| 22 | 2.07 | 0.02 | 0.9998 | 7 |
| 28 | 3.12 | 0.04 | 0.9995 | 7 |

Linear regression for the data of each series of the experiments with a shorter connecting channel: Y=B×X. The gradient B is the average mass of one single injection. The values for 35 or 50 injections were slightly smaller than expected due to the decreasing bed height during the injection series. Therefore they were not used for the calculations in some cases (see column N).

Figure 4B:
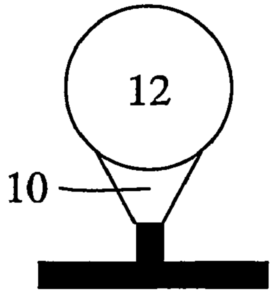
Figure 8:
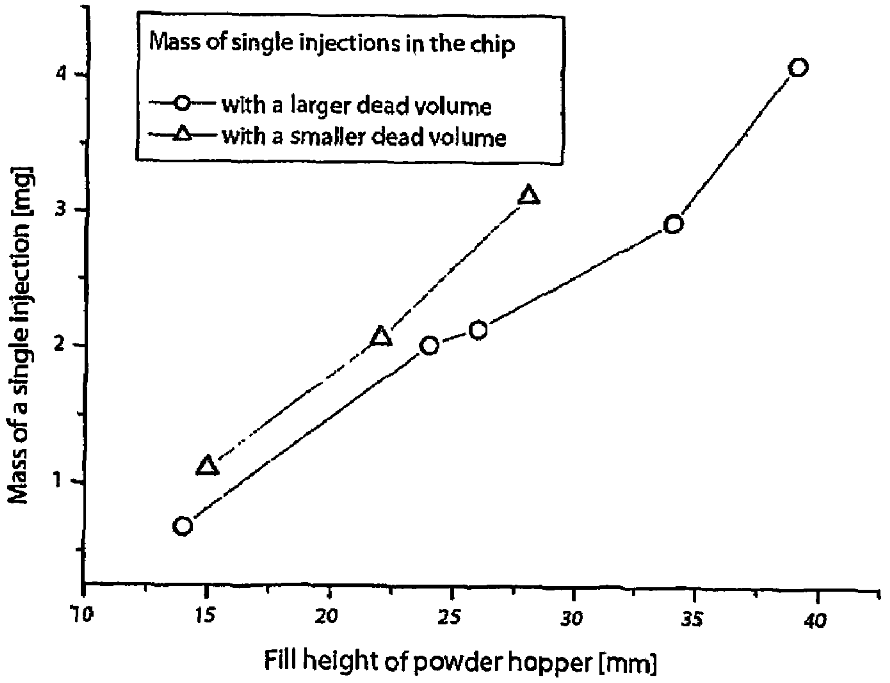
FIG. 8 is a graph showing a comparison of the average single injection mass obtained using the channel arrangement shown in FIG. 4*a* and the channel arrangement shown in FIG. 4*b;*

The average mass of an injection in the chip with the shorter connecting channel (FIG. 4*b*) was found to be higher than in the one with the longer channel (FIG. 4*a*) as evident from FIG. 8. As predicted this channel posed a dead volume that retained a predetermined amount of powder during every injection. The average values of the second experiments (using a channel as shown in FIG. 4*b* with a smaller dead volume) return a smaller value when intersecting the Y-axis.

The intersections of the straight lines obtained from the linear regression, that give the specific mass retained in the channel, should correlate with the volume of the channel 10 which can be calculated from the dimensions of the channel.

The results of the injection experiments confirm that the amount of powder injected depends on the fill height of the powder hopper. It may be possible to describe the mass of x injections with a one-dimensional function of the decreasing fill height. For practical implementation the fill height of the powder hopper may have to be monitored continuously to control the calculated values.

Figure 9:
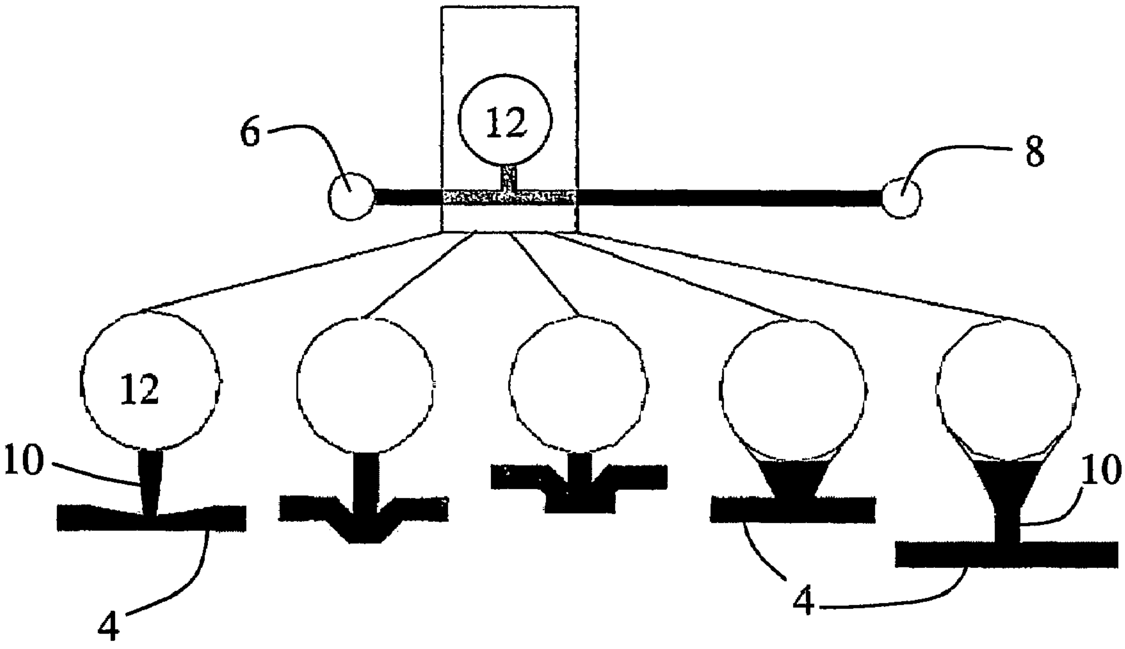
FIG. 9 shows other exemplary embodiments of the arrangement of the powder inlet and the channel.

Other designs for the channel crossing are envisaged. Some examples of further designs for the crossing between the channel 4 and the power supply channel 10 are shown in FIG. 9. To minimise the overall time, the time for fluidisation and injection can be optimised.

Figure 10:
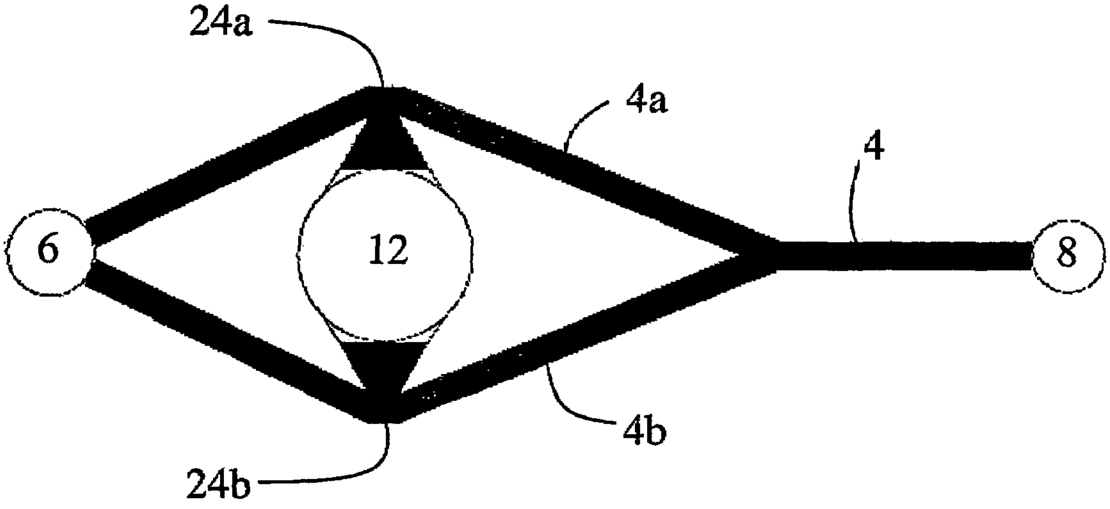
FIG. 10 shows a further embodiment in which two channels are fed from one powder inlet.

FIG. 10 shows a further embodiment of a micro fabricated powder injection device. In this embodiment the channel 4 includes a bifurcated section having two injection channels 4*a* and 4*b*. The gas inlet 6 is in fluid connection with each of the injection channels 4*a* and 4*b*. These injection channels merge into a signal injection channel 4 and lead to the outlet 8. In use, when gas is supplied via the gas inlet 6, it travels along both injection channels 4*a* and 4*b* and enters the powder inlet 12 from opposed sides. This causes increased fluidisation within the powder of the powder reservoir 14. When the gas pressure is switched off, in a rapid manner, the fluidisation of the powder in the powder inlet causes a powder plug to be formed at each intersection 24*a*, 24*b* of the powder supply channel with the injection channel. Such an embodiment may enhance the performance of the fluidised bed owing to its small symmetric gas connection.

The negative pressure injection method and system described provides a powerful method to separate and transport small amounts of non-cohesive dry powders. The micro fabricated powder injection device may be used to supply injections of powder material to a micro fabricated powder mixing device. This mixing may be implemented within the channel 4 downstream of the powder supply channel 10 or a separate micro fabricated powder mixing device may receive the output from the outlet 8. Mixing may be achieved in an additional fluidised bed that a plurality of injection channels lead to. The mixing bed should be placed in the middle of the chip. Each of the plurality of injection channels 4 may introduce different powders at different rates while they provide the gas flow to enable fluidisation within the mixing bed at the same time. Through slight compaction of the mixed powder bed it may be possible to transfer the mixture onto a table press without allowing it to demix, thus allowing the pressing of pills out of blends generated with a chip-based device and testing them for pharmaceutical requirements concerning mass, volume, contents, friability, dissolution time etc.

The skilled person will appreciate that modification of the disclosed arrangement is possible without departing from the invention. Accordingly, the above description of several embodiments is made by way of example and not for the purposes of limitation. It will be clear to the skilled person that minor modifications can be made to the arrangements without significant changes to the operation described above. The present invention is intended to be limited only by the scope of the following claims.

The invention claimed is:

1. A powder injection method for use with a powder injection microchip, the powder injection microchip comprising:

a gas supply inlet for supplying gas;

control means for controlling the supply of gas via the gas supply inlet;

an outlet;

a channel in fluid connection with the gas supply inlet and the outlet;

a powder inlet in fluid connection with the channel, receiving an open first end of a powder reservoir, the powder reservoir having an opening at or near to a second end of the powder reservoir to allow egress of gas from the powder reservoir at a point distal to the first end of the powder reservoir;

the method comprising the steps of:

(i) supplying gas via the gas supply inlet to the channel and the powder inlet at a velocity sufficient to cause fluidisation of powder at the powder inlet;

(ii) reducing the supply of gas to cause powder to pass from the powder inlet and to collect in a region of the channel adjacent a point where the powder inlet connects with the channel; and (iii) repeating steps (i) and (ii) a plurality of times, subsequent initialisation of step (i) causing the powder collected in the channel to be moved by the gas towards the outlet.

2. A powder injection method according to claim 1 wherein in step (ii) the supply of gas is reduced to zero.

3. A powder injection method according to claim 1 wherein the amount of powder collected in the channel is determined by a height of the powder in the powder reservoir.

* * * * *